United States Patent
Tinker

(10) Patent No.: US 10,489,104 B2
(45) Date of Patent: Nov. 26, 2019

(54) METHOD AND APPARATUS FOR GENERATING HARMONICS USING POLYNOMIAL NON-LINEAR FUNCTIONS

(71) Applicant: Tempo Semiconductor, Inc., Austin, TX (US)

(72) Inventor: Darrell Eugene Tinker, Austin, TX (US)

(73) Assignee: TEMPO SEMICONDUCTOR, LLC, Austin, TX (US)

(*) Notice: Subject to any disclaimer, the term of this patent is extended or adjusted under 35 U.S.C. 154(b) by 0 days.

(21) Appl. No.: 15/203,393

(22) Filed: Jul. 6, 2016

(65) Prior Publication Data

US 2017/0011004 A1 Jan. 12, 2017

Related U.S. Application Data

(60) Provisional application No. 62/190,858, filed on Jul. 10, 2015.

(51) Int. Cl.
| | |
|---|---|
| *G06F 1/02* | (2006.01) |
| *G06F 17/10* | (2006.01) |
| *G06F 3/16* | (2006.01) |
| *G10L 21/038* | (2013.01) |

(52) U.S. Cl.
CPC ............ *G06F 3/165* (2013.01); *G06F 1/022* (2013.01); *G06F 17/10* (2013.01); *G10L 21/038* (2013.01)

(58) Field of Classification Search
CPC .......... G06F 1/022; G06F 1/0321; G06F 17/10
See application file for complete search history.

(56) References Cited

U.S. PATENT DOCUMENTS

| 6,740,518 B1* | 5/2004 | Duong | G01N 27/3277 |
| | | | 435/287.1 |
| 8,195,111 B2* | 6/2012 | Van Zeijl | H03B 19/14 |
| | | | 375/317 |
| 2008/0175409 A1* | 7/2008 | Lee | G10H 1/06 |
| | | | 381/98 |
| 2016/0336878 A1* | 11/2016 | Torres | H02N 2/02 |

* cited by examiner

*Primary Examiner* — Chuong D Ngo
(74) *Attorney, Agent, or Firm* — Artie Pennington; Hunt Pennington Kumar & Dula, PLLC

(57) ABSTRACT

A method and apparatus for generating harmonics using polynomial non-linear functions. Polynomial functions are used to produce harmonics of an input signal up to a predetermined order, and that match a preferred set of characteristics. The preferred characteristics include approximating a sine function to generate odd harmonics, and using a function with zero slope at −1, 0, and +1 to generate even harmonics. The polynomial coefficients may be chosen such that most of the coefficients for the odd polynomial function are scaled by the same constant as the coefficients for the even polynomial function, so that the calculation is shared between the two polynomials. In one embodiment, a digital signal processor having a pipelined ALU and a MAC is used to calculate the desired polynomial non-linear functions.

15 Claims, 4 Drawing Sheets

METHOD AND APPARATUS FOR GENERATING HARMONICS USING POLYNOMIAL NON-LINEAR FUNCTIONS

CROSS-REFERENCE TO RELATED APPLICATIONS

This application is related to the following:
1. Provisional Application Ser. No. 62/190,858, filed 10 Jul. 2015 ("Parent Provisional");
2. application Ser. No. 14/961,861, filed 7 Dec. 2015 "First Related Application";
3. application Ser. No. 15/060,475, filed 3 Mar. 2016 "Second Related Application";
4. International Application No. PCT/US16/26055, filed 5 Apr. 2016 "Third Related Application"; and
5. application Ser. No. 15/188,960, filed 21 Jun. 2016 ("Fourth Related Application").

This application claims priority to the Parent Provisional, and hereby claims benefit of the filing date thereof pursuant to 37 CFR § 1.78(a)(4).

The subject matter of the Parent Provisional and the First, Second, Third and Fourth Related Applications, each in its entirety, is expressly incorporated herein by reference.

BACKGROUND OF THE INVENTION

1. Field of the Invention

The present invention relates to a method and apparatus for generating harmonics using non-linear functions.

2. Description of the Related Art

In general, in the descriptions that follow, I will italicize the first occurrence of each special term of art that should be familiar to those skilled in the art of integrated circuits ("ICs") and systems. In addition, when I first introduce a term that I believe to be new or that I will use in a context that I believe to be new, I will bold the term and provide the definition that I intend to apply to that term. In addition, throughout this description, I will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, I may refer to the mutually exclusive boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Hereinafter, when I refer to a facility I mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC, or distributed across multiple ICs. Depending on cost and other known considerations, the electronic components, including the facility-instantiating IC(s), may be embodied in one or more single- or multi-chip packages. However, unless I expressly state to the contrary, I consider the form of instantiation of any facility that practices my invention as being purely a matter of design choice.

Shown in FIG. 1 is a typical general purpose computer system 10. In particular, in recently-developed battery-powered mobile systems, such as smart-phones and the like, many of the discrete components typical of desktop or laptop devices illustrated in FIG. 1 are integrated into a single integrated circuit chip.

Shown by way of example in FIG. 2 is one embodiment of a single-chip audio coder/decoder ("CODEC") 12 comprising: a plurality of digital modules; and a plurality of analog modules. In this embodiment, CODEC 12 includes a Serial Data Interface facility adapted to send data to, and receive digital data from, the system 10; a Digital Phase-Locked Loop ("DPLL") facility adapted to determine the timing and rate relationship between two asynchronous data streams; a Configuration Memory and Control facility adapted to control which facilities are used and how, in accordance with configuration and control information received from the system 10; a Digital Signal Processor ("DSP") facility adapted to perform various data processing activities in accordance with a stored computer program; and a Data Memory facility adapted to store, as required, audio data flowing from the system 10 to the audio output devices. I may expand on the functionality of certain of these facilities as I now explain the method of operation of my invention and embodiments thereof.

Non-linear functions are often used in audio bass enhancement algorithms, to produce harmonics of tones that are too low to be reproduced in a particular speaker system. Some nonlinear functions that have been used in prior art include clipping, absolute value, and trigonometric functions, such as sine. Symmetrical clipping and absolute value functions produce high order harmonics at relatively high volume levels, requiring the higher order harmonics to be filtered out, to avoid unwanted artifacts such as mid-range buzzing. Furthermore, in digital systems, higher order harmonics can be aliased to lower frequencies, which may be at audible levels in the audio band needed for the bass enhancement algorithm to work. Thus, it may not be feasible to remove these aliased higher order harmonics without causing undesirable noise.

Using a sine non-linear function can produce odd harmonics without the un-wanted higher order harmonics, but trigonometric functions require much more computational hardware or software. A large look-up table ("LUT") of pre-calculated sine values can be used instead of calculating each time a sample is needed, but this also requires hardware, either in logic, RAM, or ROM. If a smaller LUT is used, un-wanted noise can be introduced from the quantization effects, both in the limited LUT index width, and the limited width of each table entry. Un-wanted higher order harmonics may also be generated by clipping. I submit that a method is needed to produce even and odd harmonics without these un-wanted side effects.

BRIEF SUMMARY OF THE INVENTION

In accordance with a first embodiment of my invention, I provide a first harmonic generation method using selected polynomial functions. In accordance with my first method, I selectively develop odd harmonics up to a first predetermined order using a first, anti-symmetrical polynomial function of odd order having coefficients selected to approximate the sine function. In addition, I selectively develop even harmonics up to a second predetermined order using a second, symmetric polynomial function of even order having coefficients selected so that the slope of the second function is substantially zero at each of a selected minimum value, a selected middle value and a selected maximum value.

In accordance with a second embodiment of my invention, I provide a second harmonic generation method using selected polynomial functions. In accordance with my second method, I receive an input sample of the signal and perform several calculations on the received input sample using selected polynomial functions. First, I calculate a first polynomial comprising a selected one of only odd powers of the input sample and only even powers of the input sample. Second, I calculate a second polynomial by adding a selected first value to the first polynomial. Third, I multiply a selected one of the first and second polynomials by a first monomial of an even power of the input sample to produce a third polynomial. Fourth, I multiply the other of the first and second polynomials by a second monomial of an odd power of the input sample to produce a fourth polynomial, And, fifth, I sum the third and fourth polynomials to produce an output sample. In accordance with my method, a selected one of the third and fourth polynomials is of at least a fourth power of the input sample.

In accordance with a third embodiment of my invention, I provide a third harmonic generation method using selected polynomial functions to produce even harmonics. In accordance with my third method, I receive an input sample of the signal, and calculate a selected polynomial comprising only even powers of the sample to produce an output sample, the selected polynomial having substantially zero slope at each of a selected minimum value, a selected maximum value, and a middle value.

In accordance with a fourth embodiment of my invention, I provide a fourth harmonic generation method using selected polynomial functions to produce odd harmonics. In accordance with my fourth method, I receive an input sample of the signal, and calculate a selected polynomial of only odd powers of the sample to produce an output sample. In accordance with this embodiment, I select the polynomial to have substantially zero slope at each of a selected minimum value and a maximum value. Further, I select the polynomial to be anti-symmetric about a middle of a selected range of input samples, and to be anti-symmetric about a middle of a selected range of output samples.

In accordance with one other embodiment of my invention, a harmonic generator facility may be adapted to practice my harmonic generation method.

In accordance with yet another embodiment of my invention, a digital signal processing system may comprise a harmonic generator facility adapted to practice my harmonic generation method.

In accordance with still another embodiment of my invention, a non-transitory computer readable medium may include executable instructions which, when executed in a processing system, causes the processing system to perform the steps of my harmonic generation method.

BRIEF DESCRIPTION OF THE SEVERAL VIEWS OF THE DRAWINGS

My invention may be more fully understood by a description of certain preferred embodiments in conjunction with the attached drawings in which.

Figure 1:
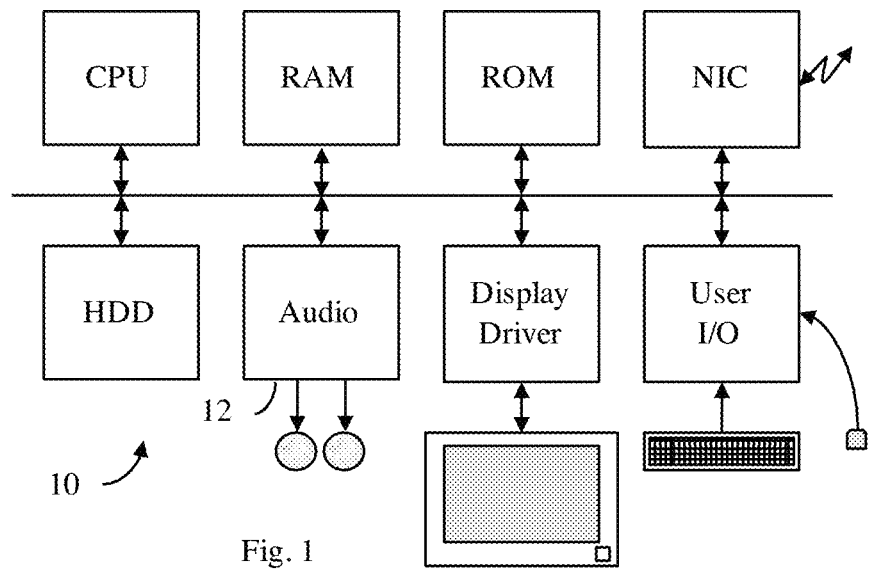
FIG. 1 illustrates, in block diagram form, a general purpose computer system adapted to practice my invention.

In the drawings, similar elements will be similarly numbered whenever possible. However, this practice is simply for convenience of reference and to avoid unnecessary proliferation of numbers, and is not intended to imply or suggest that my invention requires identity in either function or structure in the several embodiments.

DETAILED DESCRIPTION OF THE INVENTION

In accordance with my invention, I propose a set of polynomial functions that produce even and odd harmonics up to a predefined order, that are easy to calculate using a multiplier/accumulator DSP, and that have the following preferred characteristics:

1. The order of the polynomial function is only as high as the highest order harmonic to be generated.
2. To generate odd harmonics using an anti-symmetrical function (anti-symmetrical with respect to both the X and Y axis, over the range of the input for X and the output for Y), only odd powers are needed in the polynomial. For example, to generate up to the 5th harmonic:

$$Y=(A*X^5)+(B*X^3)+(C*X) \quad\quad\quad [\text{Eq. 1}]$$

wherein the coefficients A, B, and C are chosen to meet the preferred characteristics.

3. To generate odd harmonics, the coefficients are chosen to approximate the sine function:

$$Y=\sin(0.5*\pi*X) \quad\quad\quad [\text{Eq. 2}]$$

where X and Y are limited to the range between −1 and +1. Alternatively, other ranges can be chosen if the sine function is scaled appropriately with respect to the input and output.

Figure 3:
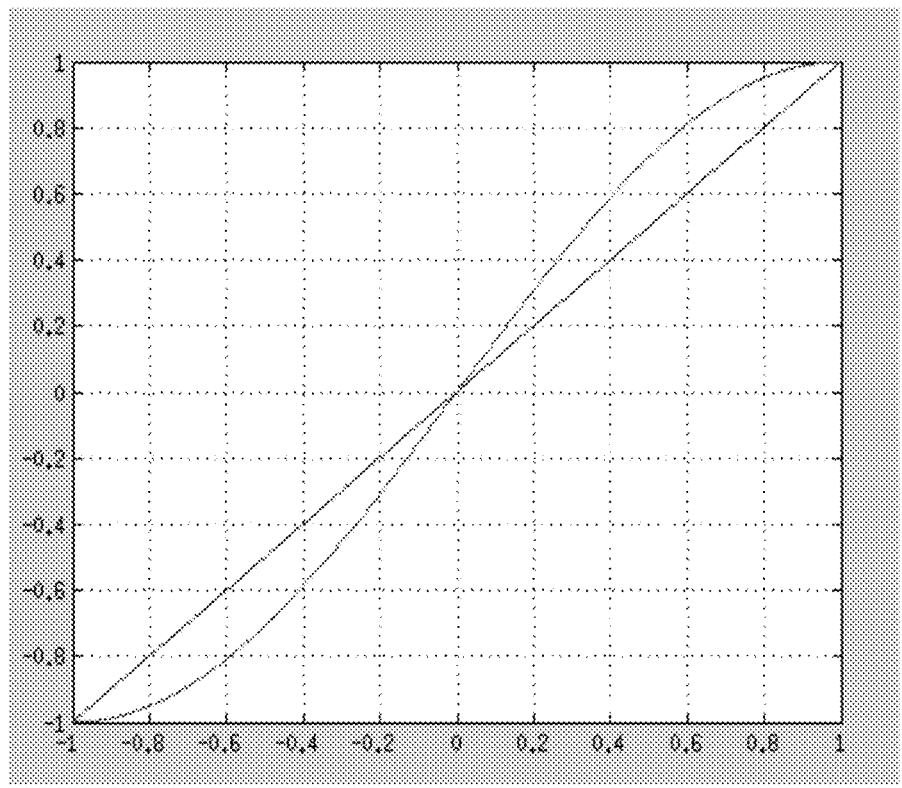
FIG. 3 illustrates, in graphical form, a 5th order polynomial selected in accordance with my invention.

The coefficients A, B, and C for the $5^{th}$ order polynomial are chosen such that the value and slope of the function match the value and slope of the sine function at −1, 0, and +1. Due to the anti-symmetry, the values needed to solve for A, B, and C are the slope at 0, the value at +1, and the slope at +1. For higher order polynomials generating higher order harmonics, additional features can be set to match more characteristics of the sine function, such as the value at intermediate points, or the values of higher order derivatives at 0 or +1. The value of the $2^{nd}$ derivative would relate to the curvature of the polynomial at a given point. By way of example, for a $5^{th}$ order polynomial meeting these criteria, the following values of A, B, and C, respectively, will produce the desired harmonics, as illustrated in FIG. 3:

$(\pi-3)/2$ $(2.5-\pi)$; and

π/2;
and the coefficient C controls the slope of the function at X=0.

Figure 4:
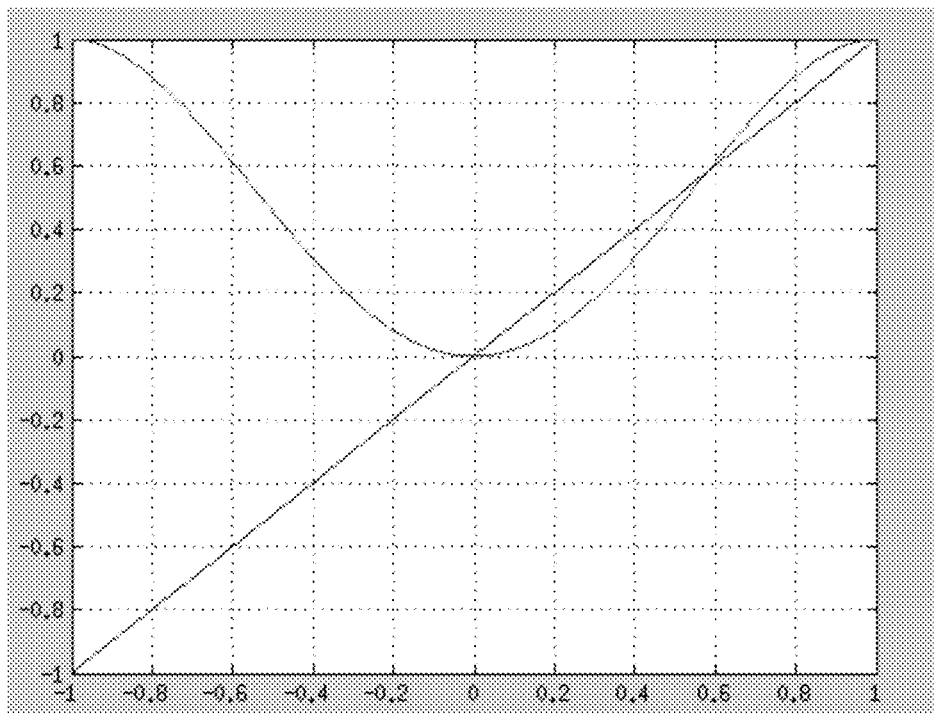
FIG. 4 illustrates, in graphical form, a 6th order polynomial selected in accordance with my invention.

4. To generate even harmonics using a symmetrical function (symmetrical with respect to the Y axis as, for example, as illustrated in FIG. 4), only even powers are needed in the polynomial. For example, to generate up to the 6$^{th}$ harmonic:

$$Y=(A*X^6)+(B*X^4)+(C*X^2);$$ [Eq. 3]

and the coefficients A, B, and C are chosen to meet the preferred characteristics.

5. The coefficients for generating even harmonics are chosen so that the slope of the function at −1, 0, and +1 is zero, assuming that the range of the input and output values are selected to be from −1 to +1. Alternatively, other minimum and maximum values may be selected. The advantage of having a zero slope at +/−1 is that if the input signal is clipped, the clipping will be softened, because as the signal approaches the maximum level (+/−1), the slope of the function decreases to zero, so there will not be a corner in the output of the non-linear function as it transitions to the clipped region.

6. The relative strengths of the generated harmonics can be controlled by changing the 2$^{nd}$ derivative of the function at X=0 (the 2$^{nd}$ derivative represents the curvature of the function at a given point). By way of example, for a 6$^{th}$ order polynomial, the following values of A, B and C, respectively, will produce harmonics, as illustrated in FIG. 4, similar to the strengths of the odd harmonics generated by the above 5$^{th}$ order sine approximation function:
(π−3);
(5−2*π); and
(π−1);
and the following coefficient values will produce stronger 4$^{th}$ and 6$^{th}$ harmonics:
1;
−3; and
3.

7. To generate higher order even harmonics (e.g., above the 6$^{th}$ harmonic), other characteristics of the function can be chosen to control the relative strengths of the higher order harmonics. For example, the curvature (i.e., 2$^{nd}$ derivative) of the function at +/−1 can be varied, or the location of the inflection point, i.e., where the 2$^{nd}$ derivative is zero between 0 and +1, can be varied.

8. The following polynomials allow calculations to be shared between the 5$^{th}$ and 6$^{th}$ order polynomials:

$$Y_6=((\pi-3)*X^6)+((5-(2*\pi))*X^4)+((\pi-1)*X^2)$$ [Eq. 4]

$$Y_5=0.5*(((\pi-3)*X^5)+((5-(2*\pi))*X^3)+(\pi*X))$$ [Eq. 5]

First this intermediate calculation is done:

$$T=((\pi-3)*X^4)+((5-(2*\pi))*X^2)+(\pi-1)$$ [Eq. 6]

Then the 5$^{th}$ and 6$^{th}$ order polynomials are completed as follows:

$$Y_6=T*X^2$$ [Eq. 7]

$$Y_5=0.5*(T+1)*X$$ [Eq. 8]

Other coefficient values can be used to achieve the desired harmonic strengths. This optimization of the calculation only requires that the A and B coefficients of one polynomial be proportional to the A and B coefficients of the other polynomial, with the same constant of proportionality applying to both the A and B coefficients. In the example above, the constant of proportionality is ½.

Figure 5:
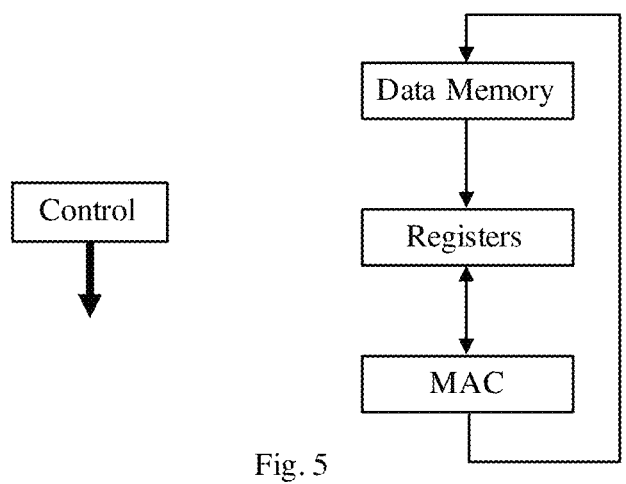
FIG. 5 illustrates, in block diagram form, one embodiment of a harmonic generator facility that may be employed to perform harmonic generation in accordance with my harmonic generation method.

The hardware to implement my polynomial non-linear functions may be instantiated as a special purpose datapath comprising at least a MAC, some registers, a data memory, and a control facility, such as is shown in FIG. 5. The control facility may include one of a ROM, a RAM, or logic, for storing a sequence of operations, and may include a finite state machine. In general, the control facility will sequence the datapath through the operations to calculate the desired polynomial.

One embodiment of the invention will perform the following operations to produce a weighted sum of a 5$^{th}$ order and a 6$^{th}$ order polynomial, given by the equation:

$$\text{Out}=(W_5*((C_6*X^5)+(C_4*X^3)+((C_2+C_1)*X)))+(W_6*((C_6*X^6)+(C_4*X^4)+(C_2*X^2)))$$ [Eq. 9]

By way of example, the several calculations comprising [Eq. 9] may be performed in respective phases of operation, as shown below, wherein each line represents a single MAC cycle and each column represents the actions of a particular phase of operation of the apparatus illustrated in FIG. 5. As will be familiar to those skilled in this art, all actions on the same line happen simultaneously; so for example, the value of A used on the same line that has an assignment to A will be the old value assigned to A in an earlier cycle. In the following example, the MAC unit calculates a product of (C*M) with an optional add of $A_0$ or $A_1$:

| Read | Pre-MAC | MAC | Post-MAC | Write |
|---|---|---|---|---|
| X | | | | |
| | M = C = X | | | |
| | C = $W_5$ | $A_0$ = X * X | | |
| | C = $C_4$; M = $X^2$ | $A_1$ = $W_5$ * X | $P_1$ = $X^2$ | |
| | T = C = $P_1$ | $A_0$ = $C_4$ * $P_1$ | $P_2$ = $W_5$ * X | |
| | C = $C_2$; M = 1 | $A_1$ = $X^4$ | | $P_2$ |
| | C = $C_6$; M = $X^4$ | $A_0$ = $A_0$ + ($C_2$ * 1) | $P_3$ = $X^4$ | |
| | C = $C_1$; M = 1 | $A_0$ = $A_0$ + ($C_6$ * $X^4$) | | |
| $P_2$ | C = T; M = $A_0$ | $A_0$ = $A_0$ + ($C_1$ * 1) | $P_4$ = ($C_6$ * $X^4$) + ($C_4$ * $X^2$) + $C_2$ | |
| | C = $P_2$; M = $A_0$ | $A_0$ = $P_1$ * $P_4$ | $P_5$ = ($C_6$ * $X^4$) + ($C_4$ * $X^2$) + $C_2$ + $C_1$ | |
| | C = $W_6$; M = $A_0$ | $A_1$ = $P_2$ * $P_5$ | $P_6$ = ($C_6$ * $X^6$) + ($C_4$ * $X^4$) + ($C_2$ * $X^2$) | |
| | | $A_1$ = $A_1$ + ($W_6$ * $P_6$) | | |
| | | | Out = $A_1$ | |
| | | | | Out |

Figure 6:
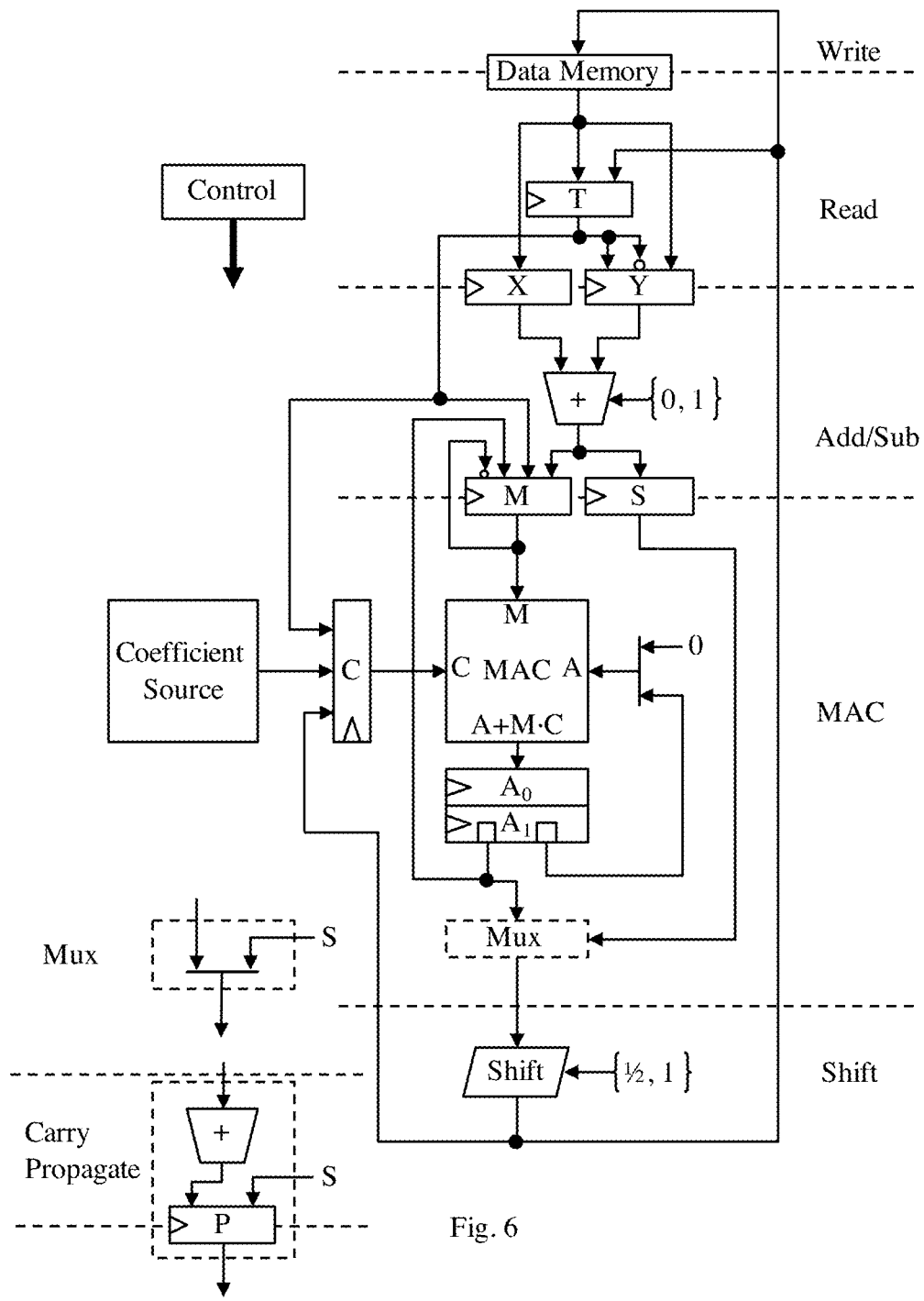
FIG. 6 illustrates, in block diagram form, one embodiment of a digital signal processor that may be employed to perform harmonic generation in accordance with my harmonic generation method.

Another preferred embodiment of the invention performs the several phases of operation in pipelined fashion, wherein each line represents a single pipeline cycle and each column represents the actions of a particular phase of operation of the apparatus illustrated in FIG. 6.

Figure 2:
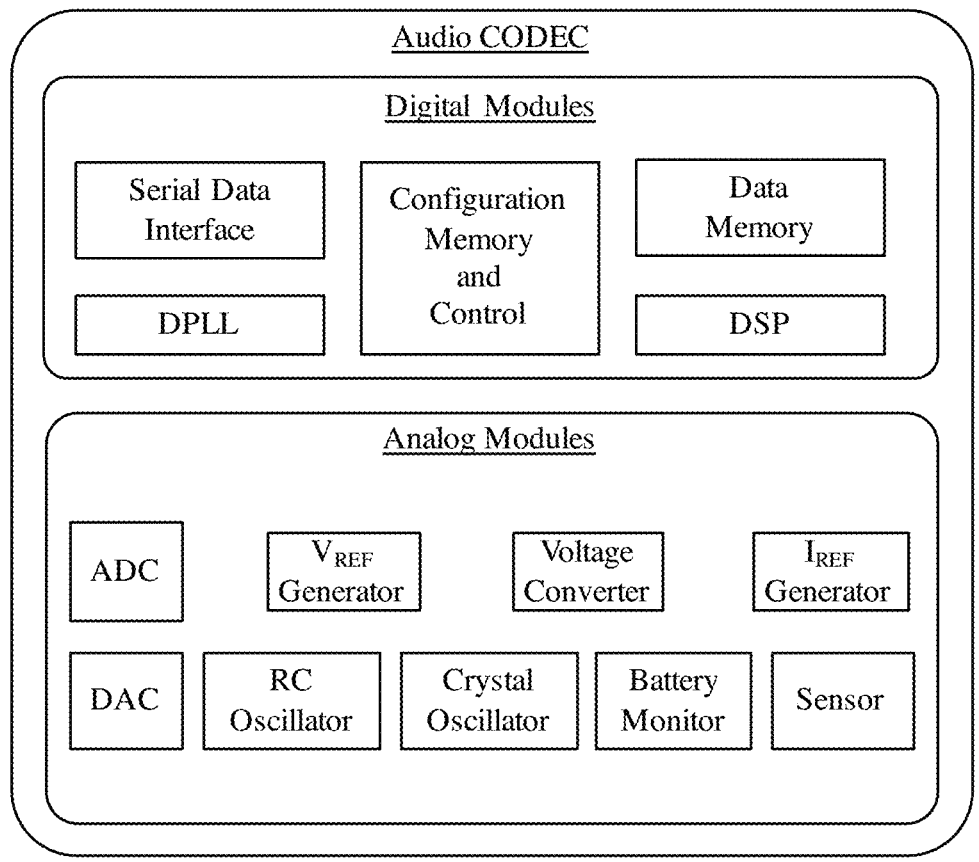
FIG. 2 illustrates, in block diagram form, a typical integrated system adapted to practice my invention.

In one other embodiment, the harmonic generator facility may comprise a general purpose DSP, such as is shown in FIG. 6, instantiated within an integrated circuit device, such as is shown in FIG. 2, installed within an audio processing system, such as is shown in FIG. 1. In such an embodiment, my method may be embodied in a non-transitory computer readable medium including executable instructions which, when executed, causes the processing system to perform the steps of any desired embodiment of my harmonic generation method.

Although I have described my invention in the context of particular embodiments, one of ordinary skill in this art will readily realize that many modifications may be made in such embodiments to adapt either to specific implementations. Thus it is apparent that I have provided a harmonic generation method and apparatus that are both effective and efficient. Further, I submit that my method and apparatus provide performance generally superior to the best prior art techniques.

What I claim is:

1. A method for use in an audio processing system comprising a harmonic generator facility for generating an even harmonic and an odd harmonic of a selected tone using selected polynomial functions, the method comprising configuring the harmonic generator facility of the audio processing system to perform the steps of:
   [1.1] developing the odd harmonic using a first, anti-symmetrical polynomial function of odd order having coefficients selected to approximate a sine function; and
   [1.2] developing the even harmonic using a second, symmetric polynomial function of even order having coefficients selected so that a slope of the second function is substantially zero at each of a selected minimum value, a selected middle value and a selected maximum value.

2. The method of claim 1, wherein, in step [1.2]:
   [1.2.1] the selected minimum value is −1;
   [1.2.2] the selected middle value is 0; and
   [1.2.1] the selected maximum value is +1.

3. The method of claim 1, wherein, in step [1.1], the first polynomial is of 5th order.

4. The method of claim 1, wherein, in step [1.2], the second polynomial is of 6th order.

5. The method of claim 1, wherein:
   in step [1.1], the first polynomial is of 5th order; and
   in step [1.2], the second polynomial is of 6th order.

6. A method for use in an audio processing system comprising a harmonic generator facility for generating an even harmonic of a selected tone, the method comprising configuring the harmonic generator facility of the audio processing system to perform the steps of:
   [6.1] receiving an input sample of the tone; and
   [6.2] calculating a selected polynomial comprising only even powers of the sample to produce an output sample, the selected polynomial having substantially zero slope at each of a selected minimum value, a selected maximum value, and a middle value.

7. The method of claim 6, wherein, in step [6.2]:
   [6.2.1] the selected minimum value is −1;
   [6.2.2] the selected middle value is 0; and
   [6.2.1] the selected maximum value is +1.

8. The method of claim 6, wherein the polynomial is of 6th order.

9. A method for use in an audio processing system comprising a harmonic generator facility for generating an odd harmonic of a selected tone, the method comprising configuring the harmonic generator facility of the audio processing system to perform the steps of:
   [9.1] receiving an input sample of the tone;
   [9.2] calculating a selected polynomial of only odd powers of the sample to produce an output sample, wherein the polynomial is selected to:
      [9.2.1] have substantially zero slope at each of a selected minimum value and a maximum value;
      [9.2.2] be anti-symmetric about a middle of a selected range of input samples; and
      [9.2.3] be anti-symmetric about a middle of a selected range of output samples.

10. The method of claim 9, wherein the polynomial approximates a sine function.

11. The method of claim 10, wherein the polynomial substantially matches the slope of the sine function at the middle of the input sample range.

12. The method of claim 9, wherein the polynomial is of 5th order.

13. A harmonic generation facility configured to perform the method of any of the claims 1 to 12.

14. A digital signal processing system comprising a harmonic generation facility according to claim 13.

15. A non-transitory computer readable medium including executable instructions which, when executed in a processing system, causes the processing system to perform the steps of a method according to any one of claims 1 to 12.

* * * * *